United States Patent [19]

Takizawa et al.

[11] Patent Number: 4,777,089

[45] Date of Patent: Oct. 11, 1988

[54] MICROCAPSULE CONTAINING HYDROUS COMPOSITION

[75] Inventors: Masahiro Takizawa, Kitasaitama; Hideyuki Takahashi, Chiba, both of Japan

[73] Assignee: Lion Corporation, Tokyo, Japan

[21] Appl. No.: 859,590

[22] Filed: May 5, 1986

[30] Foreign Application Priority Data

May 8, 1985 [JP] Japan ................................. 60-95978
May 8, 1985 [JP] Japan ................................. 60-95980

[51] Int. Cl.$^4$ ..................... B01J 13/02; B32B 23/12; B32B 27/30; B32B 27/34
[52] U.S. Cl. ........................ 428/402.22; 252/174.11; 252/174.13; 252/DIG. 13; 264/4.1; 264/4.3; 424/56; 424/455; 426/534; 426/638; 426/650; 427/213.3; 427/213.35; 427/213.36; 428/402.2; 428/402.21; 428/402.24;
[58] Field of Search ...................... 264/4.1; 427/213.3, 427/213.35, 213.36; 428/402.2, 402.22, 402.24

[56] References Cited

U.S. PATENT DOCUMENTS 3,594,326 7/1971 Himmel ..................... 428/402.22 X
3,816,331 6/1974 Brown, Jr. et al. ............. 264/4.1 X

FOREIGN PATENT DOCUMENTS 291940  8/1971  Austria .
352686 10/1979  Austria .
 38585  7/1984  European Pat. Off. .
1122495  9/1964  Fed. Rep. of Germany .
1184323 12/1964  Fed. Rep. of Germany .
1185153  9/1965  Fed. Rep. of Germany .
1248015  8/1967  Fed. Rep. of Germany .
1294346  5/1969  Fed. Rep. of Germany .
2819535 11/1978  Fed. Rep. of Germany ....... 264/4.1
3224135 12/1983  Fed. Rep. of Germany .
57-203455 12/1982  Japan .
929404  6/1963  United Kingdom ................. 264/4.3
1008044 10/1965  United Kingdom ................. 264/4.3

Primary Examiner—Richard D. Lovering
Attorney, Agent, or Firm—Armstrong, Nikaido, Marmelstein & Kubovcik

[57] ABSTRACT

A microcapsule containing hydrous composition containing an electrolyte and microcapsules coated with a water-soluble polymer which undergoes phase separation by the action of the electrolyte. The electrolyte causes the above-mentioned phase separation comprising 5% to 80% by weight of water and water-soluble components.

1 Claim, No Drawings

MICROCAPSULE CONTAINING HYDROUS COMPOSITION

BACKGROUND OF THE INVENTION

1. Field of the Invention

The present invention relates to a hydrous composition containing microcapsules and a process for the production of microcapsules. More specifically, it relates to a hydrous composition containing microcapsules, in which useful components are protected stably by microencapsulation and the effect of the useful components can be exhibited by dissolution of the microcapsules when diluted with water during use.

2. Description of the Related Art

Methods for stably protecting useful components by microencapsulation in aqueous compositions are described in, for example, Japanese Unexamined Patent Publication (Kokai) No. 49-453, Japanese Patent Publication (Kokoku) No. 50-25011, German Patent No. 1268316, U.S. Pat. No. 4,115,316. According to these methods, useful components are coated with a water-insoluble coating agent or useful components are coated with a water-soluble coating agent followed by application of chemical treatment on the coating agent for insolubilization to obtain water-insoluble microcapsules, before being formulated into a hydrous composition. However, when this composition is used, it is necessary to destroy the microcapsules by the application of a mechanical force, whereby there is involved the problem that not only a long time is required before destruction of the microcapsules, but also the useful components cannot be utilized 100% effectively due to the difficulty in destroying uniformly all of the microcapsules. Further, since a mechanical force is required during use, the scope of usage has been itself limited.

On the other hand, Japanese Unexamined Patent Publication (Kokai) No. 50-3105 proposes to formulate water-soluble microcapsules in an anhydrous shampoo or rinse composition. However, since the composition is made anhydrous, there are problems such that useful water-soluble components become insolubilized to make formulation difficult or that the price of the composition becomes higher, and its uses have been also limited.

Microcapsules have excellent functions such that liquid or gaseous materials can be handled as solid materials, that substances readily reactive with each other can be separated, that substances can be protected from surrounding environment, and that the conditions for releasing the core material can be controlled. Various processes have been known for the preparation of such microcapsules. Among them, the process for production of microcapsules by utilization of liquid-liquid phase separation (coacervation) is an industrially useful production process, since excellent microcapsules having a high coating ratio and dense coating can be produced with a high efficiency.

However, in the prior art, when attempts are made to produce microcapsules with a wall material of a polyvinyl alcohol according to this process, a practically useful microcapsule cannot be obtained, because of the difficulty in forming the separated phase endowed with the physical properties demanded for capsule formation. For example, when microcapsules are produced according to the simple coacervation method by an addition of an electrolyte to an aqueous polyvinyl alcohol solution, the separated phase fails to enclose the capsule core material or, if the capsules are formed, the capsules became agglomerated into a coarse mass.

Under such circumstances, Japanese Examined Patent Publication (Kokoku) No. 47-51714 proposed a process for microencapsulation according to the simple coacervation method with the use of a complicated bound product of a polyvinyl alcohol and a polyhydroxy aromatic substance as the wall material. However, the polyhydroxy aromatic substance has a reducing ability and a strong chemical activity, and has the properties of readily binding or reacting with a metal or compounds having an amino, hydroxyl, aldehyde group, etc., and therefore the core material may be undesirably denatured or deteriorated depending on the capsule core material employed. Also, the presence of a polyhydroxy aromatic substance posed a problem of discoloration of the capsules by air, light, or metal ions. Japanese Examined Patent Publication (Kokoku) Nos. 47-51712 and 47-51713 also teach the use of alkyleneglycol cyclic borates instead of the polyhydroxy aromatic substance mentioned above. However, these additives have the same problems mentioned above.

SUMMARY OF THE INVENTION

Accordingly, the object of the present invention is to eliminate the above-mentioned disadvantages of the prior art and to provide a composition which can maintain stably useful components in an aqueous composition by microencapsulation and can release the useful components by dissolution of the microcapsules when diluted with water during use.

Another object of the present invention is to produce microcapsules with a polyvinyl alcohol as the wall material efficiently by a simple procedure.

Other objects and advantages of the present invention will be apparent from the following description.

In accordance with the present invention, there is provided a microcapsule containing hydrous composition comprising (i) an electrolyte and (ii) microcapsules composed of a core material coated with a water-soluble polymer which undergoes phase separation by the action of said electrolyte. The content of the electrolyte is 5% to 80% by weight based on the total weight of water and the electrolyte.

In accordance with the present invention, there is also provided a process for producing microcapsules according to the simple coacervation method by dispersing a capsule core material substantially insoluble in water in an aqueous solution containing a first water-soluble polymer selected from the group consisting of polyvinyl alcohol, sulfated cellulose, water-soluble nylon, gelatin, and poly(meth)acrylic acid and also adding the inorganic or organic salt thereto, which comprises incorporating a second water-soluble polymer which undergoes substantially no phase separation with the above inorganic or organic salt together with the first water-soluble polymer in said aqueous solution.

From a study of the effect of electrolytes on the stability of microcapsules, it has been found that microcapsules coated with a water-soluble polymer which undergoes phase separation with an electrolyte penetrability of the film will be markedly improved and extremely stabilized when the electrolyte concentration reaches a certain level or higher, while they can be dissolved when diluted with water. During dilution, it is possible to utilize the water contained in saliva, sweat, etc.

Also, ionic surfactants have been found to have similar functions as electrolytes in general. Further, it has been discovered that some water-soluble polymers which undergo substantially no phase separation with inorganic electrolytes conventionally used may undergo specific phase separation with an ionic surfactant and become stabilized at a certain level of ionic surfactant or higher.

The electrolyte used in the present invention is contained in the composition in an amount of 5% to 80% by weight. The electrolyte is added in an amount which makes the microcapsules coated with the water-soluble polymer substantially inpenetrable, and it is formulated to be contained in an amount within the range from 5% to 80% by weight based on the total weight of the water and the electrolyte. The electrolyte concentration at which inpenetrability of the film is markedly improved differs depending on the electrolyte within the range from 5% to 80%. For example, it is about 5% in the case of sodium sulfate, and about 10% in the case of sodium chloride. A preferable concentration of the electrolyte is 10 to 60% by weight. If the concentration of the electrolyte is less than 5 weight %, the coated film is very soft with a high water content and the microcapsules will be markedly agglomerated. On the other hand, while the electrolyte concentration is more advantageously higher for stability of the film, too high a concentration will result in precipitation of solid electrolytes, thereby causing undesirably separation of the system. Here, the electrolyte concentration refers to the concentration of and electrolyte capable of contributing to phase separation of the water-soluble polymer.

As the electrolyte, there may be employed inorganic and organic salts, ionic surfactants, and amino acids, preferably having a higher degree of electrolytic dissociation and higher charges.

Inorganic salts may include, for example, water-soluble metal salts and ammonium salts of inorganic acids such as sulfuric acid, sulfurous acid, hydrochloric acid, perchloric acid, hypochloric acid, phosphoric acid, metaphosphoric acid, boric acid, iodic acid, periodic acid, carbonic acid, vanadic acid, tungstic acid, silicic acid, nitric acid, nitrous acid, hydrofluoric acid, hydrobromic acid, etc.

Organic salts may include, for example, water-soluble metal salts and ammonium salts of organic acids, amino acids and water-soluble metal salts thereof, chelating agents, quaternary ammonium salts, and others.

Amino acids may include, for example, glutamic acid, alanic acid, glycine, and asparginic acid.

Among the electrolytes, ionic surfactants can cause phase separation even for water-soluble polymers which will not undergo phase separation with conventional electrolytes such as inorganic electrolytes. Examples of ionic surfactants are shown below.

Anionic Surfactants:
Carboxylic acid salts such as soap, N-acylamino acid salts, alkylethercarboxylic acid salts, acylated peptides, etc.
Sulfonic acid salts such as alkylsulfonic acid salts, alkylbenzene or alkylnaphthalenesulfonic acid salts, sulfosuccinic acid salts, α-olefinsulfonic acid salts, N-acylsulfonic acid salts, alkylamidosulfonic acid salts, α-sulfoaliphatic acid ester, etc.
Sulfate salts such as sulfated oils, alkyl sulfate salts, alkylether sulfate salts, alkylarylether sulfate salts, alkylamide sulfate salts, etc.
Phosphate ester salts such as alkyl phosphate salts, alkylether phosphate salts, alkylarylether phosphates, etc.

Amphoteric Surfactants:
Alkylbetaine type amphoteric surfactants such as alkylcarboxybetaine type, alkylsulfobetaine type; alkylaminocarboxylic acid salts; imidazoline derivative type amphoteric surfactants such as alkylimidazoliniumbetaine type, etc., and phosphate type amphoteric surfactants.

Cationic Surfactants:
Fatty acid amine salts and quaternary ammonium salts.
Aromatic quaternary ammonium salts.
Heterocyclic quaternary ammonium salts such as alkylpyridinium salts, alkylimidazolium salts, etc.

The water-soluble polymers to be used in the present invention may be one which can undergo phase separation into two phases of a highly concentrated phase and a low concentrated phase of polymers by the addition of an electrolyte, preferably a polymer of which the highly concentrated phase becomes further intensified by increasing the concentration of the electrolyte.

Examples of the water-soluble polymer which can undergo phase separation with conventional electrolytes, typically inorganic salts, and ionic surfactants include, for example, polyvinyl alcohol, sulfated cellulose, casein alkali metal salts, water-soluble nylons, and methyl cellulose.

The polyvinyl alcohol usable in the present invention comprises at least 50% by weight of vinyl alcohol components in the polymer. In addition to the polymer (homopolymer) in which all the polymers consist of vinyl alcohol units, polymers with 50% by weight or more of vinyl alcohol component containing other components such as vinyl acetate, vinyl propionate, vinyl butyrate, etc., and anionically modifed products thereof or cationically modified products thereof are also included in the polyvinyl alcohol as mentioned in the present invention.

Polyvinyl alcohols are generally available as hydrolyzates of polyvinyl acetates, having preferably 70 to 100 mole % of hydrolysis. Also, two or more polyvinyl alcohols with different hydrolysis ratios may be used as a mixture. The concentration of the polyvinyl alcohol in an aqueous solution suitably should be 0.5 to 15% by weight, preferably 1 to 10% by weight.

Water-soluble nylons are modified polyamides endowed with the function of being soluble in water or alcohols as exemplified by a commercial product of AQ nylon produced by Toray K.K.

Water-soluble polymers capable of causing phase separation with ionic surfactants include carboxymethyl cellulose, hydroxyethyl cellulose, hydroxypropyl cellulose, hydroxypropylmethyl cellulose, gum arabic, carageenan, alginic acid salts, guar gum, phosphorylated guar gum, pectin, xanthan gum, furcellaran, arabinogalactan, carboxymethyl or ethyleneglycol derivatives of chitin or chitosan, gum karaya, spino gum, gum tragacanth, locust bean gum, tamarind gum, hydrolyzed ethylene-maleic anhydride copolymer, hydrolyzed methyl vinyl ether-maleic anhydride copolymer, and poly(meth)acrylic acid salts.

Water-soluble polymers capable of causing phase separation with inorganic or organic salts or amino acids are gelatine and poly(meth)acrylic acid. Examples of gelatin may include alkali method gelatin and acidic treated gelatin.

The composition of the present invention can be produced by applying the process for producing microcapsules in general. For example, when the useful material (core material) is hydrophobic, microcapsules can be produced according to the coacervation method in general in which the useful material is dispersed in fine particles in an aqueous solution of a water-soluble polymer, and a non-solvent for the polymer or an electrolyte is added, or a pH change is effected. In the case when the water-soluble polymer is a polyvinyl alcohol, it is preferable to use the process proposed by the present applicant under the title of "Process for Production of Microcapsules" filed on even date herewith Japanese patent application No. 60-95978, filed May 8, 1985, published Nov. 12, 1986 in Japan as JP-A-No. 61-254243. This process permits a water-soluble polymer which does not undergo phase separation with the added electrolytes to be co-present in the aqueous solution in effecting phase separation of an aqueous polyvinyl alcohol solution with an electrolyte, whereby no coarse agglomeration of microcapsules occurs but stable microcapsules can be obtained. It is also possible to utilize the orifice process in which a double nozzle is used, the spray drying process, the pan coating process, etc.

When the useful component is a hydrophilic material, microcapsules can be produced by spraying a coating solution on the surface of the useful material (core material) according to the pan coating process, fluidized bed coating process, etc. Also, the spray drying process is utilizable. On the other hand, when the useful material is a liquid, the microcapsules can be prepared according to the processes as mentioned above after it is absorbed or adsorbed onto fine powder or adsorbents. The microcapsule obtained is dispersed in an aqueous liquid composition so that the electrolyte concentration may be 5% to 80% by weight. It is also possible to prepare a composition in the form of a slurry of paste by dispersing water-insoluble particles in a composition.

According to the present invention, as mentioned above, microcapsules can be prepared according to a simple coacervation method by dispersing a capsule core material substantially insoluble in water in an aqueous solution containing a first water-soluble polymer selected from the group consisting of polyvinyl alcohol, sulfated cellulose, water-soluble nylon, gelatin, and poly(meth)acrylic acid and also adding inorganic or organic salt thereto, which comprises incorporating a second water-soluble polymer which undergoes substantially no phase separation with the above inorganic or organic salt together with the first water-soluble polymer in said aqueous solution. Examples of the second water-soluble polymer which undergoes substantially no phase separation with an electrolyte include carboxymethyl cellulose, methyl cellulose, hydroxyethyl cellulose, hydroxypropyl cellulose, hydroxypropylmethyl cellulose, polyvinyl pyrrolidone, polyacrylic acid salts, hydroxypropylated starch, alginic acid salts, carageenan, gum arabic, xanthan gum, pectin, furcellaran, guar gum, gum karaya, spino gum, gum tragacanth, locust bean gum, tamarind gum, hydrolyzed ethylene-maleic anhydride copolymer, hydrolyzed methyl vinyl ether-maleic anhydride copolymer, and poly(meth)acrylic acid salts. Among them, carboxymethyl cellulose, hydroxypropylated starch, and alginic acid salts pectin, furcellaran, guar gum, gum karaya, spinio gum, gum tragacanth, locust bean gum, tamarind gum, hydrolyzed ethylene-maleic anhydride copolymer, hydrolyzed methyl vinyl ether-maleic anhydride copolymer, and poly(meth)acrylic acid salts are preferred. Especially when pectin is used in combination with furcellaran, guar gum, gum karaya, spino gum, gum tragacanth, locust bean gum, or tamarind gum, microcapsules having a thicker wall can be advantageously obtained without causing the agglomeration of the resultant microcapsules.

The second water-soluble polymer which undergoes substantially no phase separation with an electrolyte (hereinafter called water-soluble polymer) should be contained in the aqueous solution suitably at a concentration of 0.005% to 20% by weight, preferably 0.01% to 10% by weight, and more preferably 0.1% to 10% by weight. The amount of the second water-soluble polymer added to the first water-soluble polymer in the aqueous solution may be suitably 0.05 to 5 parts by weight, preferably 0.1 to 3 parts by weight of the second water-soluble polymer, per 1 part by weight of the first water-soluble polymer.

For the capsule core material, a solid or liquid material insoluble in water is used as desired, depending on the purpose of use.

For the electrolyte, the above-mentioned inorganic and organic salts in general may be used either alone or as a mixture of two or more compounds.

Of these salts, it is preferable to use sulfates such as sodium sulfate, potassium sulfate, magnesium sulfate, aluminum sulfate, ammonium sulfate and the like; chlorides such as sodium chloride, potassium chloride, magnesium chloride, calcium chloride, ammonium chloride and the like; phosphates such as dipotassium hydrogen phosphate, potassium dihydrogen phosphate, disodium hydrogen phosphate, sodium dihydrogen phosphate and the like; carbonates such as sodium carbonate, sodium hydrogen carbonate, potassium hydrogen carbonate and the like.

In the present invention, a capsule core material is dispersed in an aqueous solution containing a first water-soluble polymer and a second water-soluble polymer which undergoes substantially no phase separation with the above-mentioned salt, and also the salt is added thereto. After dispersion of the capsule core material in the aqueous solution, the salt can be added to the dispersion system, or alternatively the salt can be added before dispersion of the capsule core material.

The salt preferably should be added as an aqueous solution with a concentration of 5% to 60% by weight. The amount of the salt added may be preferably within a range which will give 2.0 to 20% by weight of the salt concentration after addition.

Addition of the salt causes phase separation, whereby the aqueous solution of the first water-soluble polymer appears as the separated phase enclosing the capsule core material. The phase separation should be carried out appropriately at a temperature of 10° to 80° C.

After completion of the phase separation, the capsule wall films are gelled by cooling to a temperature of about 0° C. to 10° C.

The capsules obtained are concentrated by centrifugation or other means, followed further by drying to be utilized as the capsules soluble in water, or the wall films may be hardened to give capsules utilizable as water-insoluble capsules. As the hardening method, there may be employed, for example, the method in which hardening agents such as borax, water-soluble salts of vanadium or uranium, aldehydes, etc. are employed.

The capsule particle size is determined substantially by the size of the capsule core material and, for example, capsules with diameters of about 1 to 5000 μm can be obtained.

The wall thickness of the microcapsules can also be controlled by adding silica or a fatty acid metal salt substantially insoluble in water to an aqueous solution containing the first and second water-soluble polymer, or a capsule core material or both thereof. By addition of these controlling agents, the thickness of the wall film of the capsule can be made thicker. Since the thickness of the capsule wall film is made thicker by increasing the amount of the controlling agent added, the wall thickness can be controlled by the amount of the controlling agent added.

As the silica, crystalline, amorphous, glassy or colloidal silicon oxide may be available, preferably those commercially available as amorphous hydrous silica.

The fatty acid metal salt which is substantially insoluble in water may include metal salts of fatty acids such as of calcium, magnesium, aluminum, iron, manganese, cobalt, lead, chromium, copper, zinc, nickel, etc., preferably metal salts of $C_8$–$C_{22}$ fatty acids.

The composition of the present invention can be formulated into various microcapsule-containing compositions by adding suitable active components or additive components depending on the uses. The following Table 1 shows application examples and examples of useful components (i.e., core materials) therein.

addition of an inorganic or organic salt to an aqueous solution containing the above-mentioned first and second water-soluble polymer molecules, a separated phase suitable for capsule formation is formed to give good microcapsules with the wall film of the first water-soluble polymer.

EXAMPLE

The present invention will now be further illustrated by, but is by no means limited to, the following Examples.

EXAMPLE 1

A condiment component (controlled to 2 or 20 μm of particle size by a grinding machine) obtained by extraction with ethyl alcohol from a purified oil residue of Rose Marie, which is a plant of the perilla family, was used as the useful component. It has been previously proposed by the present Applicant in Japanese Unexamined Patent Publication (Kokai) No. 57-203445 that this condiment component is a component having the effect of inhibiting (deodorizing) mouth odor. By use of this condiment component as the core material, microencapsulation was conducted by applying the invention filed by the present applicant under the title of "Process for Production of Microcapsules" on even date herewith Japanese patent application No. 60-95978, filed May 8, 1985, published Nov. 12, 1986 in Japan as JP-A-No. 61-254243.

TABLE 1

| Field | | Applied Articles and Components | |
|---|---|---|---|
| | | Article | Useful components |
| Diluted with water, capsules dissolved by addition of water | Washing agent | Detergent for laundering | Perfume, bleaching agent, enzyme, finishing agent for clothing |
| | | Detergent for kitchen (tableware) | Perfume, Bleaching agent, enzyme, hand roughening preventive |
| | | Shampoo, Rinse | Perfume, Bleaching agent, conditioning agent, sterilizer, galenical |
| | | Detergent for face washing, hand washing, bath | Perfume, enzyme, sterilizer, galenical |
| | | Detergent for bathtub, toilet, glass, house | Perfume, enzyme, acid, alkali, sterilizer, deodorant, water repellant |
| | | detergent for automobile | Perfume, anti-rust agent |
| | | Bleaching agent | Bleaching agent, activator, perfume |
| | Others | Volatilizer | Perfume, volatilizer |
| | | Agent for bath | Perfume, galenical |
| | | Hair conditioner | Perfume, sterilizer, galenical |
| Capsules dissolved with water or saliva or sweat | Oral articles | Tooth paste Tooth wash Mouth washing agent Oral cream | Flavor, enzyme, various pharmaceutical components (prevention of decayed teeth, prevention of pyorrhea, removal of mouth odor, scaling), galenical |
| | | Washing agent for artificial teeth | Enzyme, bleaching agent, perfume |
| | Cosmetics | Anti-sweat agent | Perfume, sterilizer, anti-sweat agent |
| | | Cream lotion | Perfume, pharmaceutical component, galenical, vitamin |
| | Foods | Dressing, mayonnaise, mustard, wasabi, purin, jelly | Flavor, condiment, vitamin, animal and vegetable oil |

According to the present invention, microcapsules coated in a water-soluble polymer can be stably maintained in a hydrous composition during storage, while the coated film can be rapidly dissolved only by dilution with water without requiring external force to release useful components during usage.

Furthermore, according to the present invention, by giving rise to a liquid-liquid phase separation by the In 250 g of an aqueous solution containing 4% by weight of a polyvinyl alcohol (saponification degree 86 to 89 mol %, polymerization degree 500) and 4% by weight of a sodium carboxymethyl cellulose (CMC: 1% aqueous solution, viscosity 10 c.p.), 10 g of the condiment component was dispersed by means of a commercially available stirring machine. CMC is a water-soluble polymer which is permitted to coexist in the system and it does not undergo phase separation by addition of sodium chloride.

Subsequently, 50 g of a 25% by weight of sodium chloride solution was added gradually at a temperature of 40° C. to obtain microcapsules containing the condiment component with the polyvinyl alcohol (particle size 5 to 50 μm). Then, 62 g of sodium chloride, 0.5 g of sodium lauryl sulfate and 1.5 g of a perfume were added and the mixture was cooled to 10° C. After aging for 2 hours, the mixture was returned to room temperature to obtain a microcapsule containing hydrous composition.

The microcapsule containing hydrous composition was found to contain 20% by weight of electrolytes (sodium chloride and ionic surfactants) and, when it was diluted to 50-fold or more with water, it was confirmed that the polyvinyl alcohol coated film of the microcapsules was dissolved in water to disappear by observation with an optical microscope. The microcapsule containing hydrous composition can be used as the mouth washing agent having mouth deodorizing action. Regarding stabilization of the condiment component by microencapsulation, a description is given in the following Comparative Example 1.

COMPARATIVE EXAMPLE 1

In Example 1, no polyvinyl alcohol was used but instead water was used to prepare a composition containing the condiment component not coated with the polyvinyl alcohol.

For the compositions of Example 1 and Comparative Example 1, stability of each condiment component was tested according to the acceleration test (stored at 40° C. for 30 days). After storage, the sample was diluted to 100-fold with water and 500 ng of methylmercaptan was permitted to act on 3 mg of the condiment component. The percentage of methylmercaptan captured was measured by gas chromatography to determine the deodorant activity (%). The results are shown in Table 2. From Table 2, it can be seen that a condiment component coated with the polyvinyl alcohol of Example 1 is clearly more stable than Comparative Example 1.

TABLE 2

| Sample | Days of storage | | |
|---|---|---|---|
| | 0 | 15 | 30 |
| Example 1 | 100 | 95 | 90 |
| Comparative Example 1 | 100 | 30 | 10 |

COMPARATIVE EXAMPLE 2

Example 1 was repeated except that 62 g of sodium chloride was not added after preparation of the microcapsules. In this case, the concentration of the electrolytes (sodium chloride+ionic surfactant) was 4.17% by weight. When this composition was stored at 40° C., microcapsules became agglomerated one day afterwards to form coarse masses.

EXAMPLE 2

A condiment composition was prepared, comprising 50% by weight of a condiment component obtained by extraction with n-hexane from the purified oil residue of Rose Marie, which is a plant of the perilla family, and 50% by weight of rapeseed oil. This condiment component is a component having the effect of inhibiting (deodorizing) mouth odor.

In 250 g of an aqueous solution containing 4% by weight of a polyvinyl alcohol (saponification degree 86 to 89 mol %, polymerization degree 500) and 4% by weight of sodium carboxymethyl cellulose (CMC: 1% aqueous solution, viscosity 10 c.p.), 10 g of the condiment composition was emulsified at 70° C. by means of a commercially available emulsifying machine to prepare a dispersion of the condiment composition with particle sizes of 20 to 80 μm. CMC has the same function as in Example 1.

Next, to the dispersion was gradually added at 40° C. an aqueous 25% by weight of sodium chloride to obtain microcapsules containing the condiment composition coated with the polyvinyl alcohol (particle size 30 to 100 μm). Subsequently, after 62 g of sodium chloride was added to the microcapsules, the mixture was cooled to 10° C. and aged thereat for 2 hours and then returned to room temperature. Then, according to centrifugal separation, a microcapsule dispersion containing 30% by weight of microcapsules containing the condiment composition coated with a polyvinyl alcohol and 14.8% by weight of sodium chloride. To 5 g of the microcapsule dispersion, the following components were added to prepare a microcapsule containing hydrous composition.

| | |
|---|---|
| Calcium carbonate | 40 g |
| Solvitol | 20 g |
| Carboxymethyl cellulose | 1.0 g |
| Sodium lauryl sulfate | 2.0 g |
| Sodium saccharide | 0.02 g |
| Perfume | 0.5 g |
| Sodium chloride | 10 g |
| Water | 21.48 g |

This microcapsule containing hydrous composition contain 21.8% by weight of electrolytes inclusive of ionic surfactants on the basis of the whole weight from which water-insoluble components are removed as being 100, and it is useful as tooth paste having a mouth deodorizing action. Tooth polishing was performed with said microcapsule containing hydrous composition and thereafter the liquid in the mouth was taken out for optical microscopic observation. As the result, the microcapsule coating was found to be dissolved. Thus, it was found that the microcapsules were not dissolved in the microcapsule containing hydrous composition, but dissolved with a small amount of water and saliva. Regarding stabilization of the condiment component by microencapsulation, this is described in Comparative Example 3 shown below.

COMPARATIVE EXAMPLE 3

In Example 2, polyvinyl alcohol was not used but instead water was used to prepare a composition containing the condiment composition not coated with the polyvinyl alcohol. For the composition of Example 2 and Comparative Example 3, stability of the condiment component was tested by the acceleration test (stored at 40° C. for 30 days) to determine the deodorant activity (%) similarly as Example 1, and the results are shown in Table 3. From Table 3, it can be seen that the condiment component coated with the polyvinyl alcohol is clearly more stable than that of Comparative Example 3.

TABLE 3

| Sample | Days of storage | | |
|---|---|---|---|
| | 0 | 15 | 30 |
| Example 2 | 100 | 93 | 90 |

TABLE 3-continued

| Sample | Days of storage | | |
|---|---|---|---|
| | 0 | 15 | 30 |
| Comparative Example 3 | 100 | 20 | 10 |

EXAMPLE 3

In 250 g of an aqueous solution containing 4% by weight of a polyvinyl alcohol (saponification degree 86 to 89 mol %, polymerization degree 500) and 4% by weight of a carboxymethyl cellulose (CMC: 1% aqueous solution, viscosity 10 c.p.), 3 g of silica powder (white carbon) was dispersed and then 20 g of a perfume composition (fruit type perfume 5%, olive oil 95%) was emulsified in a stirring tank to particle sizes of 200 to 500 μm. The function of CMC is the same as in Example 1.

Subsequently, 50 g of a 25% aqueous sodium chloride was gradually added at 40° C. to obtain microcapsules containing the perfume composition with the polyvinyl alcohol (particle size 200 to 600 μm). After the addition of 60 g of sodium chloride to the microcapsules, the mixture was cooled to 5° C. and then left to stand at room temperature. The microcapsule phase of the upper phase was separated to obtain a microcapsule dispersion containing 30% by weight of microcapsules and 14.5% by weight of sodium chloride. To 3 of the thus prepared microcapsule dispersion, the following components were added to prepare a microcapsule containing hydrous composition.

| Sodium polyoxyethylene alkyl ether sulfate | 15 g |
|---|---|
| Sodium lauryl sulfate | 7 g |
| Anhydrous sodium sulfate | 3 g |
| Perfume | 0.5 g |
| Water | 71.5 g |

In these compositions, the total concentration of the electrolytes inclusive of ionic surfactants is 25.4% by weight. The above composition is useful as shampoo. When this composition was stored at 40° C. for 30 days, the microcapsules were stable without being destroyed. When hair was washed with this composition (shampoo), the microcapsules were immediately dissolved by the spraying of water to generate the perfume fragrance of the contents.

EXAMPLE 4

To 5 g of the microcapsule dispersion prepared according to the procedure of Example 3 (containing 30% by weight of microcapsules, containing fruit type perfume composition coated with the polyvinyl alcohol, and 14.5% by weight of sodium chloride), the following components were added to prepare a microcapsule containing hydrous composition containing 30.7% by weight of electrolytes.

| Sodium α-olefinsulfonate | 22 g |
|---|---|
| Straight magnesium alkylbenzenesulfonate | 6 g |
| Anhydrous sodium sulfate | 2 g |
| Ethyl alcohol | 3 g |
| Perfume | 0.5 g |
| Water | 61.5 g |

This microcapsule containing hydrous composition is useful as a detergent for tableware. The microcapsules are stable in this composition without destruction or dissolution, and remain stable even after elapse of 30 days at 40° C. When used in a standard use amount of the detergent for tableware (1.5 ml dissolved in one liter of water), the microcapsules were dissolved in water to generate a fresh fruit type fragrance.

EXAMPLE 5

To 5 g of microcapsules containing 10% by weight of a perfume as the core material coated with carboxymethyl cellulose prepared by the spray drying method (particle size 100 to 500 μm), the following components were added to prepare a microcapsule containing composition containing 39% by weight of ionic surfactant.

| Sodium straight alkyl sulfate | 25 g |
|---|---|
| Sodium α-olefinsulfonate | 5 g |
| Sodium toluenesulfonic acid | 7 g |
| Sodium hydroxide | 4 g |
| Glycine | 8 g |
| Perfume | 0.1 g |
| Water | 45 g |

This composition is useful as a detergent for clothing. The microcapsules in this composition are stable without destruction or dissolution, and when it was used in a standard use amount (20 g of composition added to 30 liters of water), the capsules were dissolved in water to generate a strong smell of perfume.

EXAMPLE 6

A 500 g amount of an aqueous solution containing 5% by weight of a polyvinyl alcohol (saponification degree: 87 to 89 mole %; polymerization degree: 500) and 5% by weight of a carboxymethyl cellulose (etheration degree: about 0.6; polymerization degree: 100 to 150) and 25 g of an olive oil (core material) were charged in a one-liter stirring tank, and the olive oil was dispersed by stirring to control its particle sizes to 50 to 150 μm.

Subsequently, 250 g of an aqueous 25% sodium chloride solution was gradually added at a temperature of 40° C. Liquid-liquid phase separation of the polyvinyl alcohol solution occurred by addition of the aqueous sodium chloride solution, and the separated phase enclosed the dispersed olive oil particles to form capsules with liquid walls.

For firming the film by a reduction of the water content in the capsule films, 90 g of sodium chloride was further added, followed by cooling to 20° C. The thickness of the wall film of the capsule thus obtained was measured by observation with an optical microscope. The results are described hereinafter together with those of Examples 2 to 5. The capsules can be separated from the aqueous solution and dried to be provided for use, but the capsule walls were chemically hardened by stirring for 15 hours with the addition of 20 ml of an aqueous 50% by weight glutaraldehyde solution.

EXAMPLE 7

The same procedure as Example 6 was conducted except for adding 7.5 g of an amorphous hydrous silica to the aqueous solution containing the polyvinyl alcohol and the carboxymethyl cellulose (aqueous phase).

EXAMPLE 8

The same procedure as Example 6 was conducted except for adding 25 g of an amorphous hydrous silica to the aqueous solution containing the polyvinyl alcohol and the carboxymethyl cellulose (aqueous phase).

EXAMPLE 9

The same procedure as Example 6 was conducted except for adding 2.5 g of an amorphous hydrous silica to the olive oil (core material).

EXAMPLE 10

The same procedure as Example 6 was conducted except for adding 2.5 g of calcium stearate (fine powder) to the olive oil (core material).

EXAMPLE 11

The same procedure as Example 6 was conducted except for adding 2.5 g of an amorphous hydrous silica to the aqueous solution containing polyvinyl alcohol and carboxymethyl cellulose (aqueous phase) and also adding 2.5 g of calcium stearate (fine powder) to the olive oil (core material).

The results of measurements of the capsules obtained in Examples 1 to 6 after dehydration are shown in Table 1. As is apparent from Table 1, the thickness of the capsule wall film can be controlled by the addition of silica and/or calcium stearate to the aqueous phase and/or the core material.

TABLE 4

| Example | Additive | Thickness of capsule ($\mu m$) |
|---|---|---|
| 6 | None | 1 |
| 7 | Silica 7.5 g (in aqueous phase) | 8 |
| 8 | Silica 25 g (in aqueous phase) | 15 |
| 9 | Silica 2.5 g (in core material) | 3 |
| 10 | Calcium stearate 2.5 g (in core material) | 2 |
| 11 | Calcium stearate 2.5 g (in core material) Silica 2.5 g (in aqueous phase) | 5 |

COMPARATIVE EXAMPLE 4

Example 6 was repeated except that an aqueous solution containing only polyvinyl alcohol was used without the use of carboxymethyl cellulose. After 250 g of an aqueous 25% sodium chloride solution was gradually added, the liquid-liquid phase separation of the polyvinyl alcohol solution occurred, but the dispersed particles were not coated therewith to form a capsule. When 90 g of sodium chloride was further added, coarse masses of the phase separated products several millimeters to several centimeters in size were formed.

EXAMPLE 12

An amount of 500 g of an aqueous solution containing 3% by weight of a polyvinyl alcohol (saponification degree: 87 to 89 mole %, polymerization degree: about 500) and 10% by weight of a hydroxypropylated starch (Stacodex produced by Matsutani Kogaku Kogyo K.K.) and 85 g of a perfume composition (composition composed mainly of phenyl ethyl alcohol, hexylsalicylate, $\alpha$-hexylcinnamicaldehyde, etc.) were charged in a one-liter stirring tank, and the perfume composition was dispersed by stirring to control its particle sizes to 30 to 100 $\mu m$. Subsequently, 100 g of an aqueous 20% by weight of sodium sulfate solution was added gradually at 40° C. By addition of the aqueous sodium sulfate solution, the liquid-liquid phase separation of the polyvinyl alcohol solution occurred, and the separated phase enclosed the dispersed particles (perfume composition particles) to form capsules with liquid walls having a wall thickness of 5 to 10 $\mu m$ before dehydration (wall thickness after dehydration: 1 to 5 $\mu m$).

After cooling to 10° C., 20 ml of an aqueous 50% by weight of glutaraldehyde solution was added and the mixture was stirred for 15 hours, followed further by stirring at an elevated temperature of 40° C. for 3 hours to thereby chemically harden the capsule walls.

The capsules were separated by centrifugation, washed with water and dried. When the capsules were disintegrated, a perfume fragrance was generated.

EXAMPLE 13

An amount of 500 g of an aqueous solution containing 3.5% by weight of a polyvinyl alcohol (saponification degree: 87 to 89 mole %, polymerization degree: about 500), 1.5% by weight of a polyvinyl alcohol (saponification degree: 100%, polymerization degree: about 500) and 5% by weight of a carboxymethyl cellulose (etheration degree: 0.6, polymerization degree: 100 to 150) was charged in an one-liter stirring tank, and 5 g of an aqueous 10% sodium sulfate solution was gradually added under stirring. A small amount of the separated layer of polyvinyl alcohol was thereby formed in droplets.

Subsequently, a core material having 6 g of an amorphous hydrous silica dispersed in 60 g of a fluid paraffin was added and further 95 g of an aqueous 20% sodium sulfate solution was gradually added. Stirring was controlled so that the particle sizes of the dispersed fluid paraffin became 50 to 200 $\mu m$. By addition of the aqueous sodium sulfate solution, polyvinyl alcohol enclosed the dispersed particles (fluid paraffin having silica dispersed therein) to form capsules. Subsequently, the capsules were cooled to 5° C. and the wall films of the capsules were hardened with the addition of 5 g of borax. After separation by centrifugation, the dried capsules were broken to release the fluid paraffin.

EXAMPLE 14

An amount of 500 g of an aqueous solution containing 3% by weight of a polyvinyl alcohol (saponification degree: 87 to 89 mole %, polymerization degree: about 500) and 0.5% by weight of sodium alginate and 90 g of a silicone oil were charged in a one-liter stirring tank, and the silicone oil was dispersed by stirring to control its particle sized to 500 to 2000 $\mu m$. Subsequently, 250 g of an aqueous 25% by weight of sodium chloride solution was gradually added. By addition of the sodium chloride solution, the liquid-liquid phase separation of the polyvinyl alcohol solution occurred, whereby substantially spherical capsules having liquid walls enclosing the dispersed particles were formed. After the addition of 10 g of sodium chloride, the capsules were cooled to 5° C. and 5 g of borax was added to harden the wall films of the capsules. After drying, the capsules were broken to release the silicone oil.

EXAMPLE 15

A 400 g amount of an aqueous solution containing 5% by weight of polyvinyl alcohol (saponification degree: 87 to 89 mole %; polymerization degree: 500), 0.6% by weight of guar gum (available from Sanei Kagaku Kogyo Kabushiki Kaisha, Bistop LH-303), and 0.4% by weight of pectin (lemon) (available from Junsei Kagaku Kabushiki Kaisha, about 60% galactoronic acid) and 40 g of an olive oil (i.e., core material) were charged in a one-liter stirring tank, and the olive oil was dispersed by stirring to control its particle sizes to 800 to 1200 $\mu m$.

Subsequently, 250 g of an aqueous 25% sodium chloride solution was gradually added at a temperature of 40° C. Liquid-liquid phase separation of the polyvinyl alcohol solution occurred by addition of the aqueous sodium chloride solution, and the separated phase enclosed the dispersed olive oil particles to form capsules with liquid walls.

For firming the film by a reduction of the water content in the capsule films, 75 g of sodium chloride was further added, followed by cooling to 10° C., the resultant capsules may be used by separating from the aqueous solution, followed by drying. However, the resultant capsules were charged with 20 ml of a 50% by weight aqueous glutaraldehyde solution and the resultant mixture was warmed to 40° C. for 5 hours while stirring. Thus, the capsule walls were chemically hardened.

During all the steps, the desired substantially spherical capsules having a thickness of the coated film of 40 to 80 μm were obtained without causing agglomeration of the particle.

COMPARATIVE EXAMPLE 6

The same procedure as Example 15 was conducted except that guar gum and pectine (i.e., lemon) was not formulated.

After gradually adding 250 g of an aqueous 25% sodium chloride solution, liquid-liquid phase separation of the polyvinyl alcohol solution occurred. However, the dispersed olive oil particles were not enclosed and no capsules were formed.

When 75 g of sodium chloride was added, the phase separated coarse mass having a size of several millimeters to several centimeters was formed.

COMPARATIVE EXAMPLE 7

The same procedure as Example 15 was conducted except that pectine (i.e., lemon) was not formulated.

When an aqueous 25% sodium chloride solution was gradually added, liquid-liquid phase separation of the polyvinyl alcohol solution occurred and the core material (i.e., an olive oil) was enclosed therewith to form capsules with liquid walls. However, after adding an aqueous 25% sodium chloride solution, the capsules were agglomerated and the agglomerated products were deposited on the agitation blades and the walls of the vessel.

EXAMPLE 16

A 400 g amount of an aqueous solution containing 5% by weight of gelatin (acid treatment method, isoelectric point=8.9), 1.0% by weight of guar gum (available from Sanei Kagaku Kogyo Kabushiki Kaisha, Bistop LH-303), and 0.001% by weight of pectin (apple) (available from Sanei Kagaku Kogyo Kabushiki Kisha, Marpee NL) and 30 g of allylisothiocyanate (i.e., allylated mustard oil, core material) were charged in a one-liter stirring tank, and the allylisothiocyanate was dispersed by stirring to control its particle sizes to 50 to 250 μm.

Subsequently, 400 g of an aqueous 30% sodium dihydrogenphosphate solution was gradually added at a temperature of 40° C. Liquid-liquid phase separation of the gelatin solution occurred by addition of the aqueous sodium dihydrogenphosphate solution, and the separated phase enclosed the dispersed allylisothiocyanate particles to form capsules with liquid walls.

For firming the film by a reduction of the water content in the capsule films, after cooling to 10° C., 170 g of sodium dihydrogenphosphate was further added, followed by aging for 2 hours. Thus, the desired microcapsules containing allylisothiocyanate therein and having a particle size of 70 to 300 μm and a gelatin wall thickness of 10 to 40 μm were obtained.

These capsules can be formulated into, as a capsule dispersion, foods such as paste mustard, paste horse-radish, and dressings. Alternatively, after separating and drying the capsules, the microcapsules can be formulated, as a spice, into various foods. When the resultant microcapsules were placed in an oral cavity, the wall membranes of the capsules were dissolved and spicy taste came to the nose.

COMPARATIVE EXAMPLE 8

The same procedure as Example 16 was conducted except that guar gum and pectine (i.e., apple) was not formulated.

After gradually adding 400 g of an aqueous 30% sodium dihydrogenphosphate solution, liquid-liquid phase separation of the gelatin solution occurred. However, the core material were not substantially enclosed by the separated liquid particles and only a very small amount of the core material was nonuniformly enclosed with the phase separated liquid particles.

Subsequently, after cooling to 10° C., when sodium dihydrogenphosphate was added, the capsules were deformed and most of them were destroyed. Thus, the allylisothiocyanate having a water solubility of 0.2% cannot be sufficiently encapsulated by an ordinal method.

When 75 g of sodium chloride was added, the phase separated coarse mass having a size of several millimeters to several centimetes was formed.

COMPARATIVE EXAMPLE 9

The same procedure as Example 16 was conducted exept that pectine (i.e., apple) was not formulated.

When an aqueous 30% sodium dihydrogenphosphate solution was gradually added, liquid-liquid phase separation of the gelatin solution occurred and the core material (i.e., allylisothiocyanate) was enclosed therewith to form capsules with liquid walls. However, after gradually adding an aqueous 30% sodium dihydrogenphosphate solution, the capsules were agglomerated and the agglomerated products were deposited on the agitation blades and the walls of the vessel.

EXAMPLE 17

A 400 g amount of an aqueous solution containing 4% by weight of gelatin (acid treatment method, isoelectric point=8.9) polymerization degree: 500), 0.8% by weight of guar gum (available from Dainihon Seiyaku Kabushiki Kaisha, Guapack PN), and 0.01% by weight of pectin (apple) (available from Sanei Kagaku Kogyo Kabushiki Kaisha, Marpee OM) and 40 g of an orange oil (i.e., core material) were charged in a one-liter stirring tank, and the orange oil was dispersed by stirring to control its particle sizes to 50 to 150 μm.

Subsequently, 400 g of an aqueous 30% sodium citrate solution was gradually added at a temperature of 40° C. Liquid-liquid phase separation of the gelatin solution occurred by addition of the aqueous sodium citrate solution, and the separated phase enclosed the dispersed orange oil particles to form capsules with liquid walls.

For firming the film by a reduction of the water content in the capsule films, 50 g of sodium citrate was further added, after cooling to 10° C., followed by aging for 2 hours. The resultant capsules were separated and dried. The capsules thus obtained could be used as a food additive.

EXAMPLE 18

A 500 g amount of an aqueous solution containing 3% by weight of water-soluble nylon (available from Toray Co. P-70), 0.2% by weight of guar gum (available from Sanei Kagaku Kogyo Kabushiki Kaisha, Bistop LH-303), and 0.005% by weight of pectin (apple) (available from Sanei Kagaku Kogyo Kabushiki Kaisha) and 35 g of liquid parafiin (i.e., core material) were charged in a one-liter stirring tank, and the liquid paraffin was dispersed by stirring to control its particle sizes to 50 to 200 μm.

Subsequently, 250 g of an aqueous 15% sodium sulfate solution was gradually added at a temperature of 40° C. Liquid-liquid phase separation of the aqueous nylon solution occurred by addition of the aqueous sodium sulfate solution, and the separated phase enclosed the dispersed liquid paraffin particles to form capsules with liquid walls.

For firming the film by a reduction of the water content in the capsule films, 42 g of sodium sulfate was further added, after cooling to 20° C. Thus, the good microcapsules having a particle size of 60 to 220 μm and a wall thickness of 5 to 20 μm were obtained without causing agglomeration. Although the resultant capsules can be hardened with, for example, an isocyanate compound, the capsules can be used in, for example, cosmetics after separating and drying.

COMPARATIVE EXAMPLE 10

The same procedure as Example 18 was conducted except that guar gum and pectine (i.e., lemon) was not formulated.

After gradually adding 250 g of an aqueous 25% sodium sulfate solution, liquid-liquid phase separation of the water-soluble nylon solution occurred and the dispersed liquid paraffin particles were encapsuled. However, when 42 g of sodium sulfate was added after cooling to 20° C., the capsules were remarkably agglomerated and the agglomerated products were deposited on the agitation blades.

We claim:

1. A microcapsule containing a hydrous composition comprising (i) at least one electrolyte selected from the group consisting of inorganic salts, organic salts, amino acids, and an ionic surfactant and (ii) microcapsule composed of a core material coated with a water-soluble polymer which undergoes phase separation by the action of said electrolyte, said water-soluble polymer being at least one member selected from the group consisting of polyvinyl alcohol, sulfated cellulose, casein alkali metal salts, and water-soluble nylons, and the content of the electrolyte being 10% to 80% by weight based on the total weight of water and the electrolyte.

* * * * *